June 17, 1969      S. CLAVE ET AL      3,450,457
EXTENSIBLE PERISCOPE
Filed March 9, 1964
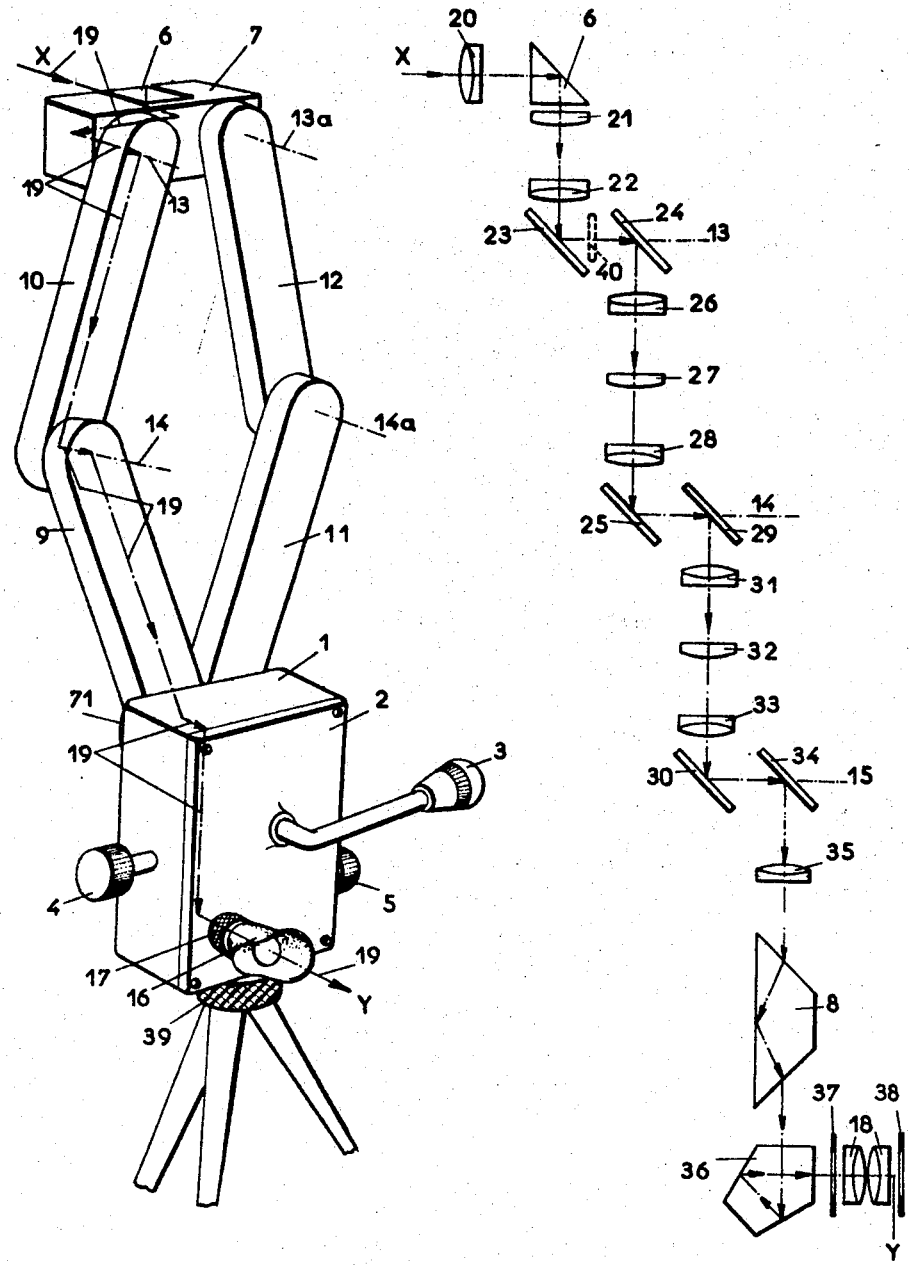
FIG. 1      FIG. 2

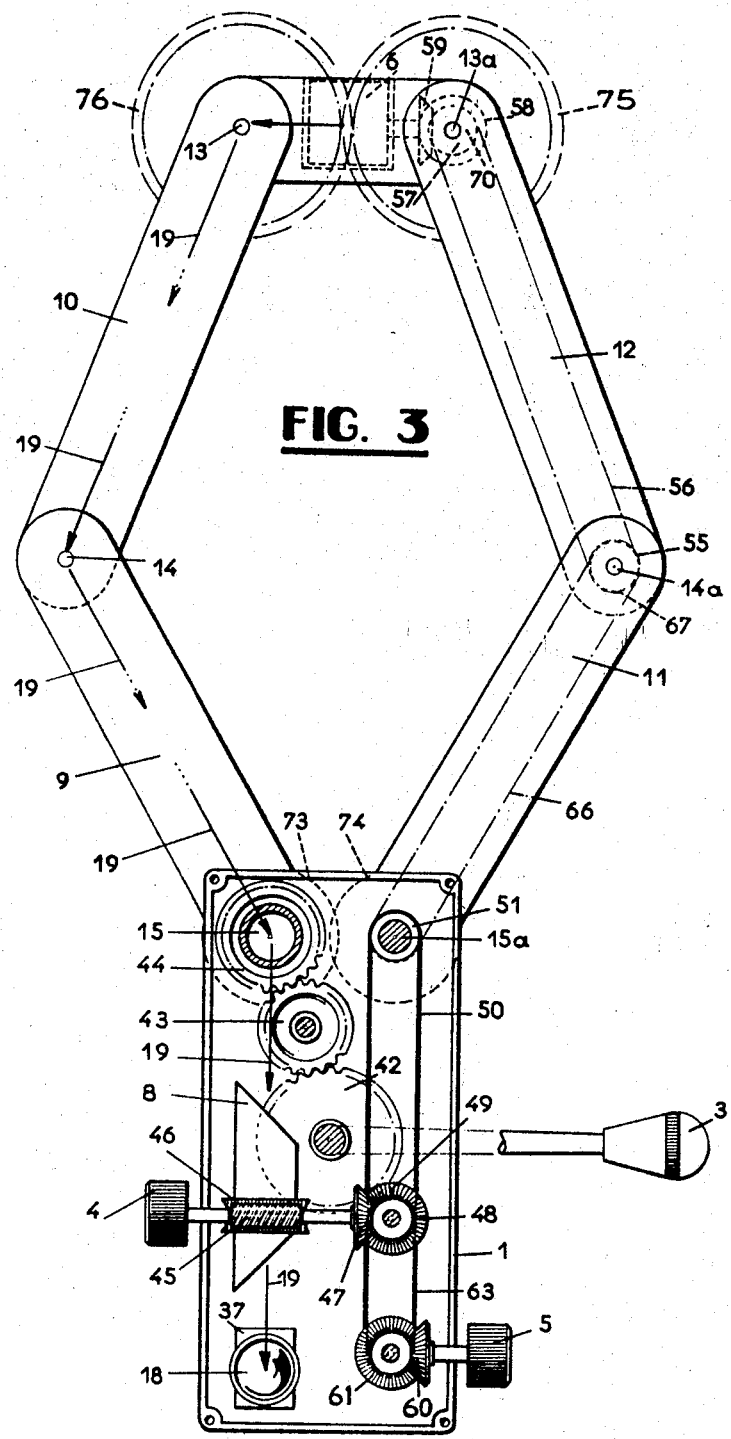

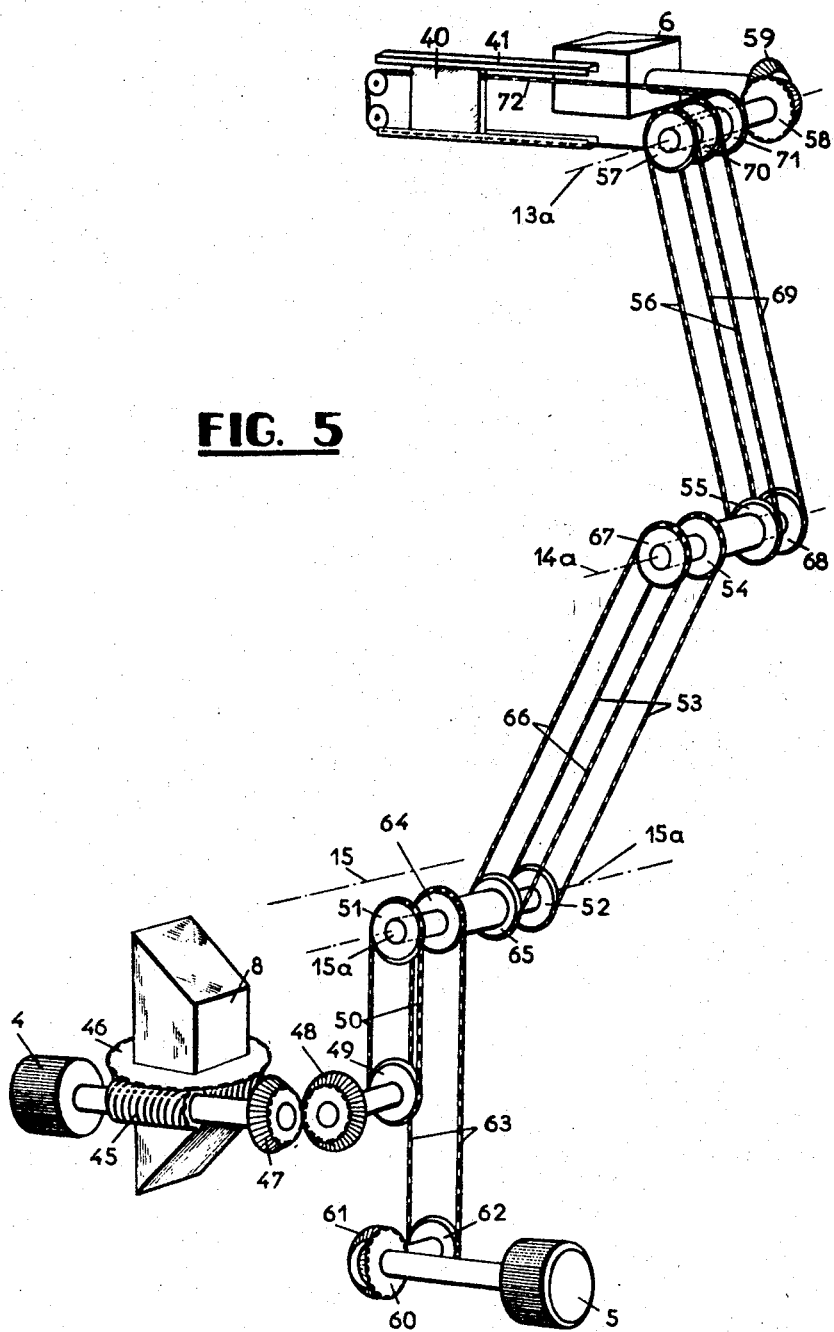

3,450,457
EXTENSIBLE PERISCOPE
Serge Clave and Marcel Clave, both of
9 Rue Olivier-Metra, Paris, France
Filed Mar. 9, 1964, Ser. No. 350,396
Claims priority, application France, Mar. 11, 1963,
927,536
Int. Cl. G02b 23/08
U.S. Cl. 350—45                           6 Claims

ABSTRACT OF THE DISCLOSURE

Extensible periscope comprising an objective and an eyepiece connected by extensible tubular parallelogram linkage which maintains the optical axes of said objective and eyepiece parallel at all positions of said linkage, and an optical system within the linkage comprising a pair of mirrors at each pivotal connection between two links, with one mirror being positioned in each link, the mirrors in each link being mounted to remain parallel to each other in all positions of the linkage.

---

In using certain optical instruments such as periscopes or endoscopes, for example, it is possible to observe zones lying at different levels or in different positions only by moving the apparatus until its objective is in axial alignment with the zone to be observed.

When an operator wishes to continuously examine different zones which are adjacent to each other, he must then move in the same direction as his optical instrument, and such movements are sometimes impractical or difficult to effect.

The present invention relates to an optical device having an extensible mounting comprising the different elements which form a one-piece periscope or endoscope distributed among the elements constituting an extensible mounting, and provided with mechanical means for transmitting to the level of a movable objective those movements necessary in the course of observation, while nevertheless permitting the eyepiece to remain stationary.

The mounting of our new optical device consists essentially of a deformable parallelogram made of four tubular members pivotally connected to each other at their ends, the objective of the instrument being positioned at one corner of the parallelogram thus formed, while the opposite corner, which is attached to the stationary part of the instrument, carries the eyepiece.

The new optical device is so arranged that the optical elements are spaced along the length of two consecutive tubes intervening between the said two corners of the parallelogram, while the mechanical members which control the movement of certain of the optical elements, as for example, the focussing of the objective, the pivoting of a prism, the insertion of a filter, or the substitution of one objective for another, are mounted in the two other tubes constituting the parallelogram.

In the optical part, which is mounted in one half of the parallelogram, two totally reflecting mirrors or prisms are positioned at each of the pivot points and two plane mirrors, one of which is mounted in each of said tubes, have their faces strictly parallel to each other.

This arrangement makes it possible to avoid any turning of the image during deformation of the parrallelogram, since the image is reflected through the same angle regardless of the shape of the parallelogram at the moment of observation.

The tubes also contain other optical elements, such as objectives and collective members.

It is well known that the use of rotating prisms as panoramic objectives leads to rotation of the image when the prism is rotated, and that this rotation may be compensated for by turning a Dove type prism inserted in the path of the light rays at an angle equal to half the angle of rotation of the rotating prism.

In the device according to the present invention the rotating prism is positioned in a box connecting the ends of two movable tubes, which box also carries the objective, while the compensating prism may be positioned in either the fixed member connecting the ends of the two other tubes or in one of the two tubes containing the optical elements.

The motion transmitting means mounted in the two other tubes are preferably controlled by chains and sprockets so that the expansion or contraction of the parallelogram has no influence thereon.

The objective may be displaced with respect to the eyepiece, upward, for example, by extending the parallelogram in that direction only, the four tubes remaining on the contrary, in the same relative horizontal position. The displacement of the objective is then equal to the sum of the lengths of the two tubes. This is hereinafter referred to as a "single acting" arrangement.

In another embodiment of the invention, which may be called the "double acting mounting," the objective may be displaced with respect to the eyeplace by extending the parallelogram on either side of its folded position, for example, vertically either up or down. In this case, the displacement of the objective may attain twice the total length of the two tubes.

It follows, that devices comprising several juxtaposed parallelograms may be constructed, for example, in order to provide binocular instruments.

The characteristics of the present invention will be better understood after reading the following description of a single-acting monocular embodiment of our periscope, which embodiment is described purely by way of example, in connection with the accompanying drawings, in which:

FIG. 1 is a perspective view of the apparatus, showing the various controls;

FIG. 2 is a schematic view showing the path followed by the median ray of a pencil of light from the objective to the eyepiece;

FIG. 3 is an elevational view showing in particular the details of the various mechanical controls mounted in the box holding the eyepiece;

FIG. 5 is a perspective view showing the means for controlling the movement of certain optical elements from a distance.

Figure 4:
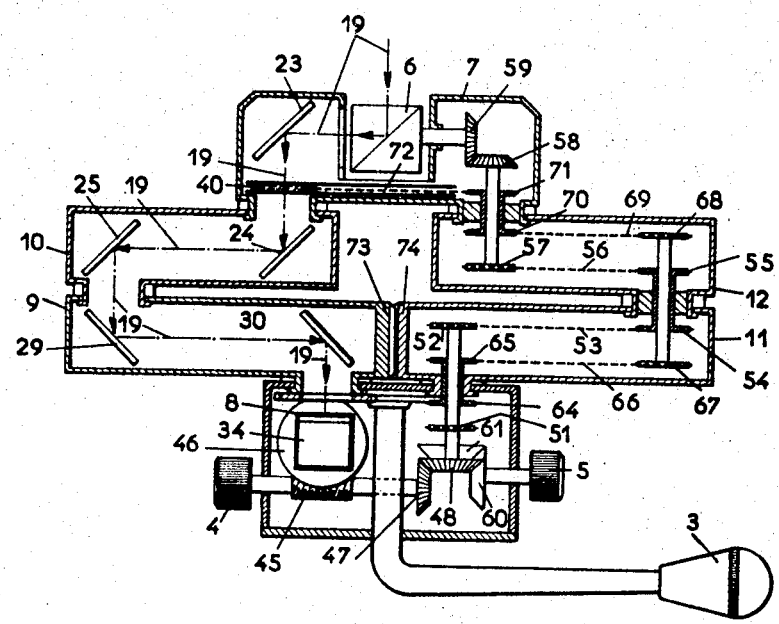
FIG. 4 is a plan view of the apparatus in which the tubes forming the parallelogram are shown in section, so as to permit the invention to be more clearly illustrated.

As shown on FIG. 1, an eyepiece box 1 closed by a cover 2, carries a lever 3 which controls the extension and contraction of the parallelogram linkage of the periscope. As shown in greater detail on FIG. 5, one of the two control buttons 4 and 5 turns the prism 6, mounted in the objective box 7, and simultaneously turns at an angle of rotation half that of the prism 6, a compensating Dove prism 8, shown on FIGS. 2–5, while the second button inserts a filter into the optical path.

The parallelogram linkage comprises four tubular members 9, 10, 11 and 12, pivotally connected to each other and to the box 7 at the axes 13–13a, 14–14a and 15–15a.

The eyepiece projects through an opening in the cover 2 of the box 1, and behind the window 16 thereof may be found the milled ring 17 by means of which the optical device may be focussed, since it acts on the lenses 18 of the eyepiece, which are shown in FIG. 2.

The broken line X–Y represents the path followed by the rays of light from the zone to be observed to the eyepiece behind the window 16. These light rays travel in the direction of the arrows 19 found along the broken lines shown on FIGS. 1 and 3.

FIG. 2 shows the objective 20, the rotating prism 6, a collective pupil 21, an objective 22 and a first plane mirror 23 mounted along the axis 13, which transmits the bundle of light rays to a second plane mirror 24 positioned on the same axis, in the tube 10, parallel to a third mirror 25 also mounted in the tube 10.

Two objectives 26 and 28 and a collective pupil 27 are also positioned in the tube 10, between the mirrors 24 and 25.

Just as the two plane mirrors 23 and 24 are mounted along the pivotal axis 13, the plane mirrors 25 and 29 (of the tube 9) are mounted on the pivotal axis 14. The plane mirror 29 is mounted rigorously parallel to a plane mirror 30 positioned on the pivotal axis 15 at the bottom of the tube 9. Between the mirrors 29 and 30 are a collective pupil 32 and two objectives 31 and 33.

Also on the pivotal axis 15 is a mirror 34 which reflects the bundle of light rays to the Dove type compensating prism 8 through the objective 35.

After having been reflected from the compensating prism 8, the bundle of light rays passes into a pentagonal prism 36, in which it is twice reflected before it reaches the diaphragm 37 defining the field image, the lenses 18 of the eyepiece, and finally the exit pupil 38.

The periscope may also have its box 1 mounted to rotate about a central vertical axis so as to permit a circular view for each position of the objective.

A milled ring 39, shown on FIG. 1, then serves to hold the box 1, together with the remainder of the apparatus, stationary in any desired position.

FIG. 3 shows the lever 3 and the two control buttons 4 and 5 which control, on the one hand, the raising and lowering of the objective and, on the other hand, the rotation of the prisms 6 and 8 and the translation of a filter member 40, shown on FIGS. 4 and 5, within a slideway 41.

Movement of the lever 3 turns a partially toothed gear 42, which in turn, acts through partially toothed gear 43 to swing the arm 9 of the parallelogram linkage, which is fixed to a gear 44 engaging the intermediate gear 43.

The gear ratio between the gears 42, 43, 44 is such that, for a relatively small movement of the lever 3, the tube 9 will turn 90° around the axis 15, thus swinging from the horizontal to the vertical.

The milled button 4 simultaneously turns the compensating prism 8 through a worm 45 which engages worm wheel 46 and the angular drive formed by the bevel gears 47 and 48.

This angular drive turns the sprocket 49 shown on FIG. 5, which sprocket drives the sprocket 51, mounted on the axis 15a, through the chain 50.

The sprocket 51 is fixed to a sprocket 52 which drives another sprocket 54, through a chain 53 mounted on the shaft 14a.

The sprocket 54 is fixed to a sprocket 55 shown on FIGS. 4 and 5, which in turn drives a sprocket 57 through a chain 56. The sprocket 57 controls, through the angular drive, 58, 59, the rotation of the prism 6.

The milled button 5 drives a sprocket 62 through an angular drive 60, 61, and sprocket 62 drives through an endless chain 63 a sprocket 64 fixed to the sprocket 65, mounted like sprocket 64, on the axis 15a. The sprocket 65 drives sprocket 67 through the chain 66.

The sprocket 67 is fixed to a sprocket 68, likewise mounted on the shaft 14a, which drives the two sprockets 70 and 71, through the chain 69.

The sprocket 71 drives through the chain 72 a filter member 40 which may be inserted in alignment with the pivotal axis 13, between the two plane mirrors 23 and 24. This filter slides along a track 41, shown on FIG. 5.

FIGS. 3 and 4 also show that the two lower tubes 9 and 11 terminate at their lower ends in gear teeth 73, 74, which engage with each other to ensure that during rotation of the tube 9 by means of the lever 3 and the gear train 42, 43, 44, the tube 11 turns through exactly the same angle.

In like manner, the upper ends of the tubes 10 and 12 are fixed to two gears 75 and 76, shown in broken lines on FIG. 3, which keep the box 7 in a horizontal position and insure the symmetry of tubes 10 and 12, when the parallelogram linkage is being extended or contracted.

It will, of course be appreciated that the specific embodiment which has been described may be modified as to detail, improved, or added to, and that specific elements may be replaced by their mechanical equivalents without thereby departing from the basic principles of the invention.

In particular, the toothed portions of the gears 42, 43, 44 may be enlarged so as to transform the illustrated single-acting apparatus into a double acting device, in which the tubes 9 and 11 swing through an angle of 180°, between an upper vertical position and a lower vertical position.

What is claimed is:

1. An optical device comprising an objective casing containing an objective, an eyepiece casing carrying an eyepiece, and longitudinally extensible parallelogram linkage means connecting said casings and maintaining the optical axes defined by said objective and eyepiece parallel at all positions of said linkage, said linkage comprising at least one series of tubular links, one of said tubular links being pivotally connected to said eyepiece casing and the other to said objective casing, and each tubular link of said series being pivotally connected to the next to turn about an axis parallel to said optical axes, and an optical system extending through said tubular links for transmitting to the eyepiece an image formed by said objective, said optical system comprising at each pivotal connection of said tubular links a pair of mirrors, one in each of the links pivotally connected to each other at that point, the mirrors of each link being positioned to remain parallel to each other at all positions of the links within which they lie.

2. An optical device comprising a first casing containing an objective, a second casing carrying an eyepiece, and parallelogram linkage means connecting said two casings and maintaining the optical axes defined by said objective and eyepiece parallel at all positions of said linkage, said linkage comprising two pairs of link members, each pair comprising a first link pivotally connected at the end to said first casing and a second link pivotally connected at one end to said second casing, the first and second links of each pair being pivotally connected to each other, at least said first pair of links being tubular in form, each pivotal connection constraining said links to turn about an axis parallel to said optical axes, and an optical system extending through said tubular links for transmitting to the eyepiece an image formed by the objective, said optical system comprising at each pivotal connection a pair of mirrors, one in each of the members pivotally connected to each other at that point, the mirrors of each member being positioned to remain parallel to each other at all positions of the members within which they lie, and means carried by said eyepiece casing for extending and contracting said linkage while said eyepiece remains stationary.

3. An optical device as claimed in claim 1 which said linkage carries interengaged toothed means fixed to at least two links thereof, and said means for extending and contracting said linkage comprises rotatable toothed means engaging one of said interengaged toothed means, and a lever connected to turn said rotatable toothed means.

4. An optical device as claimed in claim 1 comprising a pivotally mounted prism positioned in said objective casing in the path of light rays travelling from said objective to said eyepiece, and a Dove type prism in said eyepiece casing likewise positioned in said path of travel to compensate for movements of said pivotally mounted prism.

5. An optical device as claimed in claim 4 comprising a control member carried by said eyepiece casing and motion transmitting means housed in said casings and linkage means for simultaneously transmitting motion from said control member to both said prisms.

6. An optical device as claimed in claim 5 comprising a filter slidably mounted in said objective casing for movement into and out of the path of light rays travelling between said objective and eyepiece, an additional control member carried by said eyepiece casing, and additional motion transmitting means housed in said casings and linkage means, for transmitting motion from said additional control member to said filter.

References Cited

UNITED STATES PATENTS

| 862,293 | 8/1907 | Swasey | 350—85 X |
|---|---|---|---|
| 1,309,478 | 7/1919 | Jenkins | 350—52 X |
| 1,607,688 | 11/1926 | Perrin et al. | 350—22 X |
| 2,057,921 | 10/1936 | Santoni. | |
| 2,589,363 | 3/1952 | Foutounis | 350—24 X |
| 2,966,096 | 12/1960 | D'Incerti et al. | 350—23 X |
| 2,988,955 | 6/1961 | Goto et al. | 350—36 X |

FOREIGN PATENTS

| 769,444 | 3/1957 | Great Britain. |
|---|---|---|
| 913,921 | 12/1962 | Great Britain. |
| 637,663 | 4/1962 | Italy. |

DAVID SCHONBERG, *Primary Examiner.*

T. H. KUSMER, *Assistant Examiner.*

U.S. Cl. X.R.

350—52, 70, 85